UNITED STATES PATENT OFFICE 1,941,990

LAMP COATING

Albert F. Lindstrom, Nutley, N. J., assignor to Westinghouse Lamp Company, a corporation of Pennsylvania No Drawing. Application November 21, 1928
Serial No. 321,041

6 Claims. (Cl. 134—1)

This invention relates to compositions of matter as employed in the art of coating, and relates more particularly to the coating of vitreous articles such as incandescent electric lamp bulbs.

In the production of electric incandescent lamps or similar articles, it is often desirable to coat the lamp bulb with a layer of light diffusing material and heretofore certain desirable effects have been obtained in an attempt to produce a bulb having an opalescent appearance.

As set forth in Patent No. 1,752,792 issued April 1, 1930, a coating composition and method of applying the same is provided whereby the coating may be applied to the interior surface of a lamp bulb, and by reason of the deposit of the coating material upon the inner wall of the bulb, the opalescent effect is obtained since the smooth outer surface of the bulb in combination with the light diffusing layer attains the appearance sought.

Obviously in the coating of lamp bulbs it is necessary to provide coatings in a variety of colors, which colors are attained by the employment of suitable pigments. It has been found, however, that although a majority of the colors may be produced commercially, certain ones thereof are difficult to attain from a practical standpoint. For example, the color green offers the greatest difficulty, since it has been found that heretofore when attempting to produce a green coating the required depth of color was unattainable since it is necessary when coating the interior surface of a bulb to provide the coating material with a pigment which would withstand the high temperature attending the sealing-in operation. It is to be understood that when coating the interior surface of a bulb the bulb must be coated prior to its consolidation by fusion with the internal structure or mount of the lamp.

Briefly the sealing-in operation consists in supporting a bulb over a mount so that a flared glass portion of the mount is disposed adjacent to the neck of the bulb. Heat is then applied to the bulb neck until the same becomes plastic and is fused to the flared portion of the mount. Heretofore when attempting to produce green as a green colored coating, the sealing-in temperature, which is approximately from 600 to 700° C., resulted in a decolorizing or breaking down of the pigment, and it has been found that in the case of green pigments there are very few which will withstand the high temperature such for example as cobalt green and chromic oxide. These pigments, however, give a dull green and are not satisfactory from a manufacturing standpoint for use as an inside coloring medium. A more brilliant green has been obtained by the use of a pigment known commercially as "Guignet Green". This pigment is a hydrated form of chromic oxide and although the same constitutes a good pigment for use in connection with outside coatings wherein it is not subjected to heat during the sealing-in operation, the said pigment breaks down or blackens around the seal when employed as an inside coating. Furthermore, in cases where a marking is applied to the top of the bulb and it is necessary to heat the marking ink to etch the same, a darkening of the pigment results.

It is an object of the present invention, therefore, to provide a pigment which will avoid the above disadvantages, and I have found that by incorporating boric acid with the mixture containing the pigment that the blackening action of the pigment is greatly reduced, and that the blackening action is diminished in direct proportion to the amount of boric acid added. It has been found in practice that by adding 80% of boric acid to the "Guignet Green" the blackening entirely disappears, and lamps may be coated with a green coating composition having the desired depth of color and the necessary uniform density on a commercial basis and without the coating breaking down or changing color during the necessary manufacturing operations which attend lamp making.

As in the example of another substance which may be used to avoid the blackening of the pigment from the heat, I have tried sodium borate, which appears to have the same action as boric acid. The use of sodium borate, however, when used in connection with a lamp bulb, seems to weaken the bulb by reason of the alkali content.

No definite theory is advanced as to exactly what the action of the boric acid on the hydrated chromium or chromic oxide may be. It seems to be a physical action of the boric acid protecting the particles of green pigment, thus preventing a breaking down or blackening of the pigment under high temperature conditions. It may be that there is a chemical action between the boric acid and the hydrated chromic oxide resulting in the formation of chromium borate, however, it is thought that the above mentioned physical action is the proper theory.

As a practical example of a composition produced in accordance with the present invention the following ingredients may be used in the proportions given although it is to be understood that such proportions may be varied without departing from the present invention.

Kaolin or china clay 50 grams; hydrated chromic oxide or "Guignet Green" 200 grams; cadmium sulphide 50 grams; boric acid 160 grams and sodium silicate 1000 c. c. of 1.015 to 1.035 specific gravity.

The cadmium sulphide is employed to tone the color of the green pigment and may be dispensed with as desired.

Although boric acid has been found preferable it is to be understood that good results are obtainable from borates generally when used with the hydrated chromic oxide to render it capable of retaining its color value when subjected to a relatively high temperature.

Ordinarily when providing a coating of the above character for such articles as lamp bulbs it is necessary to increase the caustic content by the addition of a substance such as sodium hydroxide to make the coating more mobile so that it will flow more readily and effectively spread over the surface to be covered. It has been found that the combination of boric acid and sodium silicate results in a reaction whereby a freely flowing composition is produced and no added caustic is necessary.

A composition of the above character may be applied to the interior surface of a bulb in any suitable manner as by flushing or preferably by being sprayed thereon by the method and apparatus set forth in Patent 1,900,104 issued March 7, 1933.

By reason of the present invention it is possible to provide a lamp bulb with a green coating composition having the required uniform density and the proper depth and color value.

Although a preferred embodiment of the invention is shown and described herein, it is to be understood that modifications may be made therein without departing from the spirit and scope of the invention as set forth in the appended claims.

What is claimed is:

1. A coating composition comprising sodium silicate, a filler, hydrated chromic oxide and boric acid.

2. A coating composition comprising sodium silicate, kaolin, chromic oxide and boric acid.

3. A coating composition comprising a sodium silicate binder, china clay, chromic oxide and a borate.

4. A coating composition comprising the following ingredients in substantially the proportions given; 50 grams of a filler, 200 grams of hydrated chromic oxide; 50 grams cadmium sulphide; 160 grams boric acid and 1000 c. c. of a solution of sodium silicate having a specific gravity of about 1.015.

5. A coating composition comprising the following ingredients in substantially the proportions given; 50 grams of a filler, 200 grams of "Guignet Green"; 160 grams boric acid and 1000 c. c. of a solution of sodium silicate having a specific gravity of about 1.015.

6. A green coating composition for the interior surface of a sealed glass envelope comprising hydrated chromic oxide, sodium silicate and boric acid.

ALBERT F. LINDSTROM.